(12) United States Patent
Eggermont

(10) Patent No.: US 12,555,975 B2
(45) Date of Patent: Feb. 17, 2026

(54) ILLUMINATION DIAGNOSIS FOR LIDAR DRIVER

(71) Applicant: SEMICONDUCTOR COMPONENTS INDUSTRIES, LLC, Phoenix, AZ (US)

(72) Inventor: Jean-Paul Anna Joseph Eggermont, Pellaines (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 911 days.

(21) Appl. No.: 17/650,748

(22) Filed: Feb. 11, 2022

(65) Prior Publication Data

US 2022/0320817 A1     Oct. 6, 2022

Related U.S. Application Data

(60) Provisional application No. 63/171,445, filed on Apr. 6, 2021.

(51) Int. Cl.
*H01S 5/042* (2006.01)
*G01S 7/484* (2006.01)
*G01S 7/497* (2006.01)
*H01S 5/00* (2006.01)
*H01S 5/40* (2006.01)

(52) U.S. Cl.
CPC ............ *H01S 5/0021* (2013.01); *G01S 7/484* (2013.01); *G01S 7/497* (2013.01); *H01S 5/0428* (2013.01); *H01S 5/4025* (2013.01)

(58) Field of Classification Search
CPC .......... H01S 5/0428; H01S 5/40–4093; H01S 5/042; H01S 5/04–06; G01S 7/48; G01S 7/00; G01S 7/4497; G01S 7/497; G01R 31/2635
See application file for complete search history.

(56) References Cited

U.S. PATENT DOCUMENTS 12,160,083 B2 *  12/2024  Zhou ................... H01S 5/0428
2006/0291510 A1  12/2006  Juluri
(Continued)

FOREIGN PATENT DOCUMENTS

DE          19621396 A1      12/1996

*Primary Examiner* — Tod T Van Roy
(74) *Attorney, Agent, or Firm* — Brake Hughes Bellermann LLP

(57) ABSTRACT

Implementations described herein are related to a diode driver that recirculates residual current from an operating current pulse in an inductor. Such recirculation produces a diagnostic current pulse to a diode array for measuring a voltage drop across a portion of the array. For example, after a controller charges an inductor of a diode driver to deliver operating current pulses to a portion of a diode array for illumination, the controller causes a residual current to remain and recirculate in the inductor. In some implementations, in response to the recirculating current reaching a monitoring threshold, the controller delivers a monitoring pulse to the portion of the diode array to measure a voltage drop across the portion of the diode array. In some implementations, the controller may infer defectivity in the portion of the array from such voltage drop measurements over time.

20 Claims, 5 Drawing Sheets

(56) References Cited

U.S. PATENT DOCUMENTS

| | | | |
|---|---|---|---|
| 2014/0204396 A1* | 7/2014 | Giger | H03K 3/57 |
| | | | 372/38.03 |
| 2014/0226147 A1* | 8/2014 | Metzler | H03K 3/57 |
| | | | 356/5.01 |
| 2018/0226878 A1* | 8/2018 | Shao | H02M 3/158 |
| 2020/0067269 A1* | 2/2020 | Eggermont | G01S 17/10 |
| 2020/0278426 A1 | 9/2020 | Dummer et al. | |
| 2021/0333362 A1* | 10/2021 | Huang | G01S 17/10 |
| 2022/0320817 A1* | 10/2022 | Eggermont | H01S 5/0428 |
| 2023/0387658 A1* | 11/2023 | Eggermont | G01S 17/10 |

\* cited by examiner

ILLUMINATION DIAGNOSIS FOR LIDAR DRIVER

RELATED APPLICATION

This application is a non-provisional of, and claims priority to, U.S. Provisional Application No. 63/171,445, filed on Apr. 6, 2021, entitled "DIODE DRIVER, LIDAR SYSTEM, AND A METHOD OF OPERATING," the disclosure of which is incorporated herein in its entirety.

TECHNICAL FIELD

This description relates to devices and methods for diagnosing illumination elements (e.g., vertical cavity surface emitting lasers (VCSELs)) used in a LIDAR system.

BACKGROUND

Many technologies use light detection and ranging (hereafter "lidar") systems to derive a map of a three-dimensional object surface, track a moving object, or detect vibrations emanating from an object. Such systems include mobile autonomous robots, safety systems for automobiles, and semi-autonomous and autonomous driving systems. Some lidar systems use a number of laser diodes in an illumination array to provide illumination. Some lidar systems use specified beams of illumination to produce specified patterns of beams incident on the object.

SUMMARY

In one general aspect, a diode driver for driving an array of diodes can include a current pulse generator configured to deliver an operating current pulse to a portion of the array of diodes, the current pulse generator producing a diagnostic current pulse in an inductor from residual current from the operating current pulse recirculating in the inductor after the operating current pulse has been delivered to the portion of the array of diodes. The diode driver can also include a voltage drop measurement device configured to measure a voltage drop resulting from a delivery of the diagnostic current pulse to the portion of the array of diodes. The diode driver can further include a device state analyzer configured to determine whether the portion of the array of diodes is defective based on the voltage drop of the portion of the array of diodes.

In another general aspect, a method can include delivering an operating current pulse to a portion of an array of diodes, the current pulse generator producing a diagnostic current pulse in an inductor from residual current from the operating current pulse recirculating in the inductor after the operating current pulse has been delivered to the portion of the array of diodes. The method can also include measuring a voltage drop resulting from a delivery of the diagnostic current pulse to the portion of the array of diodes. The method can further include determining whether the portion of the array of diodes is defective based on the voltage drop of the portion of the array of diodes.

In another general aspect, a lidar system can include an array of diodes configured to produce illumination in response to receiving an amount of current, and a diode driver for driving an array of diodes. The diode drive can include a current pulse generator configured to deliver an operating current pulse to a portion of the array of diodes, the current pulse generator producing a diagnostic current pulse in an inductor from residual current from the operating current pulse recirculating in the inductor after the operating current pulse has been delivered to the portion of the array of diodes. The diode driver can also include a voltage drop measurement device configured to measure a voltage drop resulting from a delivery of the diagnostic current pulse to the portion of the array of diodes. The diode driver can further include a device state analyzer configured to determine whether the portion of the array of diodes is defective based on the voltage drop of the portion of the array of diodes.

In some implementations, the diagnostic current pulse is a first diagnostic current pulse and the voltage drop is a first voltage drop. In some implementations, the current pulse generator, after producing the first diagnostic current pulse, produces a second diagnostic current pulse for measuring a second voltage drop. In some implementations, the device state analyzer determines whether the portion of the array of diodes is defective based on the first voltage drop and the second voltage drop.

In some implementations, the device state analyzer includes a first capacitor storing charge from diagnostic current pulses. In some implementations, the device state analyzer includes a conversion device to convert first charge stored on the first capacitor from the first diagnostic current pulse and second charge stored on the first capacitor from the second diagnostic current pulse to a voltage signal that indicates a variation of voltage drop of the portion of the array of diodes over time.

In some implementations, the conversion device includes a second capacitor, a hold switch, and a comparator connected in parallel, the hold switch holding charge on the second capacitor for measurement. In some implementations, the conversion device includes a transfer device transferring the charge on the first capacitor to the second capacitor after the diagnostic current pulse has been delivered.

In some implementations, the first capacitor is reset prior to the current pulse generator delivering the first diagnostic current pulse.

In some implementations, each portion of the array of diodes is a respective row of the array of diodes, and wherein the device state analyzer is connected to each row of the array of diodes via a parallel connection.

In some implementations, the diagnostic current pulse has a width between 2 nanoseconds and 10 nanoseconds.

In some implementations, the current pulse generator includes (i) a low-side switch (SWL) which, when closed, is configured to couple the second induction terminal to the ground terminal, and (ii) a shorting switch (SHRT) which, when closed, is configured to couple the first induction terminal to the ground terminal. In such implementations, the current pulse generator recirculates the current in the inductor when the SWL and the SHRT are both closed.

In some implementations, the current pulse generator includes a current threshold detector that detects when the current in the inductor has reached a threshold current after which the current pulse generator is configured to deliver the diagnostic current pulse.

In some implementations, the current pulse generator includes (i) a low-side switch (SWL) which, when closed, couples a second induction terminal to a ground terminal, and (ii) a shorting switch (SHRT) which, when closed, is configured to couple a first induction terminal to the ground terminal. In such implementations, the current threshold detector is arranged between the SWL and the ground terminal.

In some implementations, the operating current pulse is delivered to the portion of the array of diodes via the inductor.

In some implementations, the operating current pulse is delivered to the portion of the array of diodes without measuring a voltage drop.

In some implementations, the voltage drop measurement device includes an analog/digital (A/D) converter, and the device state analyzer configured to determine whether the portion of the array of diodes is defective based on the voltage drop of the portion of the array of diodes is further configured to determine based on a digital algorithm.

The details of one or more implementations are set forth in the accompanying drawings and the description below. Other features will be apparent from the description and drawings, and from the claims.

DETAILED DESCRIPTION

Figure 1:
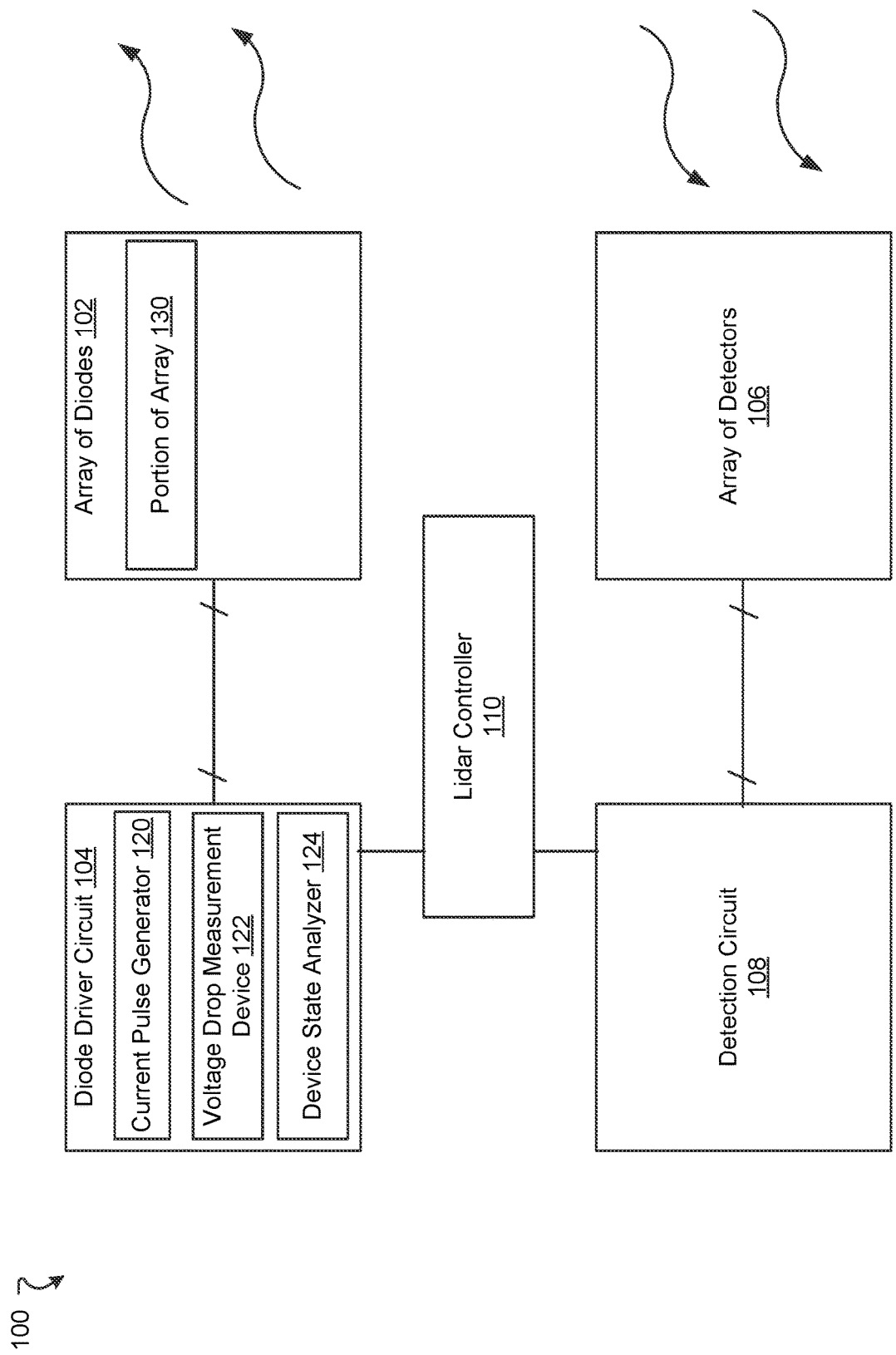
FIG. 1 is a block diagram that illustrates an example light detection and ranging (lidar) system.

Some light detection and ranging (lidar) systems use vertical cavity surface emitting lasers (VCSELs) as illumination sources in an illumination array. Such lidar systems use VCSELs for their density, resolution, and power efficiency. Lidar is used for monitoring and tracking distant targets as well as detecting vibration for audio applications. For example, lidar may be used to track a person in a crowded environment.

Some lidar systems have illumination arrays with defective pixels, or illumination elements. Defective pixels in the illumination array may be an issue with regard to eye safety and/or operational safety. In some implementations, an illumination array can have 100 rows of 128 pixels. In some implementations, an illumination array can have between 10 k and 80 k or more pixels.

One example of a defective pixel is a pixel that is configured to be on but is not illuminating or is illuminating with insufficient brightness. Another example of a defective pixel is a pixel that is configured to be off but is illuminating with a brightness greater than a threshold. A defective pixel's impedance may be different from an expected impedance.

Because portions of the illumination array that have at least one defective pixel (or a defective switch directing current to the row of pixels) may have an adverse effect on the humans operating the lidar system and/or a human target of the lidar system, the portions of the illumination array may be checked for defects, e.g., by checking row characteristics indicating defective pixels in a row. Such characteristics include process gradients and thermal gradients, which can cause significant differences between the rows of the illumination array.

The implementations described herein include a system that measures each row characteristic, e.g., a voltage drop across a portion of an illumination array for a given current used to activate the pixels of the row. When the array is made up of VCSEL diodes, the array is referred to as an array of diodes. When the row characteristics include process and thermal gradients, the voltage drop over time indicates which pixels of the portion of array of diodes are and are not defective.

Some conventional techniques of defect detection in arrays of diodes used in lidar systems include introducing a dedicated element to a system to measure the output of each pixel. For example, such an element may take the form of an additional photodiode or power monitor used to measure optical power emitted from a pixel.

The addition of such an extra element, however, poses some issues. One such issue is power consumption—the presence of an extra element uses additional power. Such additional power may negatively affect the power consumption of the lidar system as a whole. In addition, adding such an extra element may increase the complexity of the lidar system and accordingly the cost. For example, some configurations measure the power from each individual pixel, greatly increasing cost, power consumption, and complexity. The solutions described herein identify defective pixels without requiring additional complexity or power consumption is sought.

Nevertheless, measuring the voltage drops without additional elements or power consumption may be challenging when the voltage drops are larger than the supply voltage. For example, in some systems, the supply voltage is about 5 V while the voltage drops may be, for example, between 9 V and 12 V. Such measurements of the voltage drop to identify defective pixels may be difficult without additional sources of power.

In contrast to at least some of the above-described conventional techniques of defect detection in arrays of diodes, the implementations described herein are related to a diode driver that recirculates residual current from an operating current pulse in an inductor. Such recirculation produces a diagnostic current pulse to a diode array for measuring a voltage drop across a portion of the array. For example, after a controller charges an inductor of a diode driver to deliver operating current pulses to a portion of a diode array for illumination, the controller causes a residual current to remain and recirculate in the inductor. In some implementations, when the recirculating current reaches a monitoring threshold, the controller delivers a monitoring pulse to the portion of the diode array to measure a voltage drop across the portion of the diode array. In some implementations, the controller may infer defectivity in the portion of the array from such voltage drop measurements over time.

The improved detection of defects in a diode array uses residual current remaining from an operating current to form a diagnostic current pulse for measuring voltage drop across a portion of the diode array. Accordingly, no additional elements are introduced into the lidar system, thus reducing cost and/or complexity. Moreover, no additional power is used for the measurements, further reducing cost.

FIG. 1 is a block diagram that illustrates an example lidar system 100. The lidar system 100 comprises an array of diodes 102, a diode driver circuit 104, an array of detectors 106, a detection circuit 108, and a lidar controller 110. During operation, the array of diodes 102 illuminates a target area (e.g., the scene in front of an automobile) with light. In one example case, the array of diodes 102 is an array of laser diodes (e.g., an array of vertical-cavity surface-emitting laser (VCSEL) diodes). In some implementations the light created by the array of diodes 102 is within the visible spectrum. In some implementations the light created is outside the visible spectrum, such as ultraviolet or infrared light.

Though not shown in FIG. 1, the array of diodes 102 is conceptually divided into portions of diodes, which is shown as a portion of array 130. In some implementations, the portion of array 130 is a row of diodes when the array of diodes 102 are arranged in a rectangular array. In some implementations, each row of the array of diodes 102 is focused on a particular portion of an area on a distant object. That is, each row is pointed and/or focused such that, when activated, a particular row illuminates a particular portion of the target area. All the rows considered together thus illuminate the entire target area, though not necessarily at the same time.

As shown in FIG. 1, the array of diodes 102 are illuminated row-by-row by the diode driver circuit 104. In particular, the diode driver circuit 104 is coupled to the array of diodes 102 such that the diode driver circuit 104 may be caused by the lidar controller 110 to individually drive each portion, e.g., row, of the array of diodes 102. The lidar controller 110 is communicatively coupled to the diode driver circuit 104 and may accordingly command the diode driver circuit 104 regarding the illumination and diagnostic process. In some implementations the lidar controller 110 causes the diode driver 104 to drive particular rows of the array of diodes. In some implementations, the particular rows are not sequential, or in even in any particular order. In some implementations, the diode driver circuit 104 provides the lidar controller 110 with an indication of the point in time when a row of the array of diodes 102 has been activated (e.g., start), and an indication of the point in time when the activation ceases (e.g., end). The lidar controller 110, in turn, may provide the indications to the detection circuits 108 and any other system that uses the start and end information.

In addition to driving the array of diodes 102, the diode driver circuit 104 may also be caused by the lidar controller 110 to determine whether there are defective pixels present in a portion of the array of diodes 102 that had been driven by the diode driver circuit 104. To this effect, the diode driver circuit includes a current pulse generator 120, a voltage measurement device 122, and a device state analyzer 124. Further details regarding diagnostics of the array of diodes 102 using these elements are presented with respect to FIGS. 2-4.

Referring to FIG. 1, some of the light launched into the target area is reflected back to the detection array 106. In some implementations, the detection array 106 includes an array of photo diodes sensitive to wavelengths of light produced by the array of diodes 102. Though not shown in FIG. 1, the detection array 106 may likewise be organized into rows, with each row of the array configured to receive light from a particular portion of the target area. That is, each row of diodes in the detection array 106 is arranged, pointed, and/or focused such that light reflected from objects in that portion of the target area is detected by the row. All the rows considered together accordingly receive reflected light from the entire target area, though not necessarily at the same time. From the light detected by each row of the detection array 106, the objects may be tracked, their vibrations detected, or their shape determined.

Figure 2:
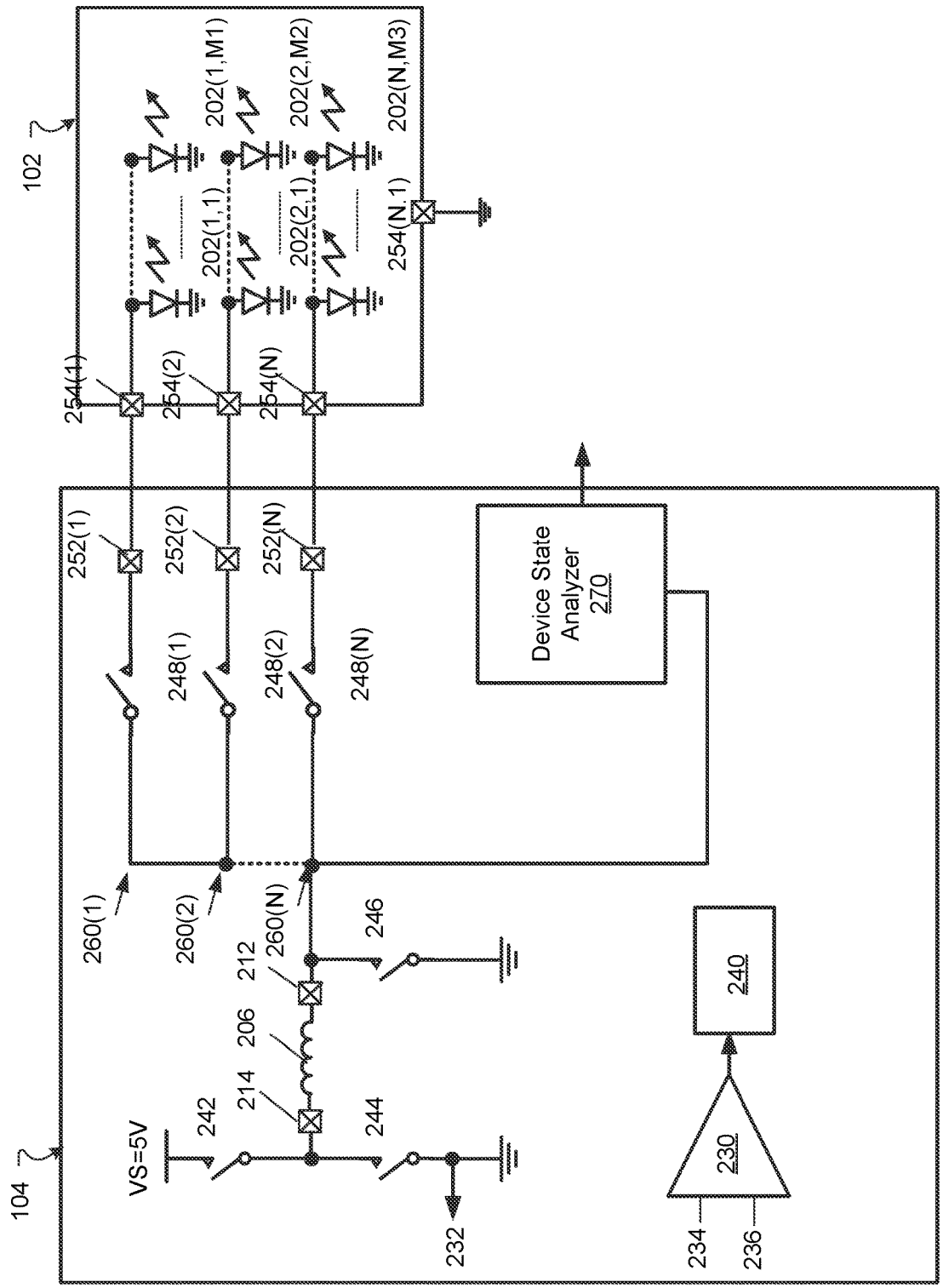
FIG. 2 is a schematic diagram that illustrates an example diode driver and diode array.

FIG. 2 is a schematic diagram that illustrates details of the diode driver 104 and the array of diodes 102. As shown in FIG. 2, The array of diodes 102 includes an array of light-emitting diodes 202(1, . . . M1), 202(1, . . . , M2), . . . , 202(1,MN). That is, as shown in FIG. 2, the array of diodes 102 is arranged in N rows, with the ith row having Mi diodes. When the array of diodes 102 is a rectangular array, M1=M2= . . . =mN. Each of the N rows of the array 102 has a corresponding terminal 254(1), 254(2), . . . , 254(N). In some implementations, the light-emitting diodes 202(1, . . . M1), 202(1, . . . , M2), . . . , 202(1,MN) are VCSELs.

As shown in FIG. 2, in each row of the array of diodes 102, e.g., 202(1, . . . , M1), the diodes of that row 202(1, . . . , M1) are arranged such that a current pulse and/or a voltage pulse activates, i.e., causes to produce illumination, all diodes in that row 202(1, . . . , M1) simultaneously (e.g., all diodes illuminated within an infinitesimally small time interval). As shown in FIG. 2, the diodes of each row, e.g., 202(1, . . . , M1) are coupled in parallel, their anodes directly coupled to each other and the corresponding terminal, in this case terminal 254(1), their cathodes directly coupled to ground. Other arrangements are possible and the arrangement shown in FIG. 2 should not be considered limiting.

The diode driver 104 is configured to produce both operating current pulses for driving the array of diodes 102 and monitoring current pulses for measuring voltage drops across a portion (e.g., a row) of diodes, e.g., row 202(1, . . . , M1), for diagnosing whether the row of diodes 202(1, . . . , M1) is defective. As shown in FIG. 2, the array of diodes 102 includes a plurality of terminals 254(1), . . . , 254(N), each of which corresponds to a respective row of diodes.

As shown in FIG. 2, the diode driver 104 includes an inductor 206. In some implementations, the inductor 206 is coupled to the diode driver 104. In such embodiments, the diode driver takes the form of a packaged semiconductor device, e.g., a 940AK package dual inline module. In some implementations, the diode driver 104 includes one or more substrates of semiconductor material (e.g., Si) within the package. In some implementations, the diode driver 104 takes the form of a bare-die lidar transceiver driver assembly (LTDA).

As shown in FIG. 2, the diode driver 104 includes a first inductor terminal 212, a second inductor terminal 214, and a plurality of driver terminals 252(1), . . . , 252(N). In some implementations, the diode driver 104 includes terminals for communication with the lidar controller 110. In such implementations, the diode driver 104 includes an interface circuit for communication of data with the lidar controller 110.

FIG. 2 also shows switches that control the flow of current through the diode driver 104 and the array of diodes 102. For example, there are a plurality of diode switches 248(1), 248(2), . . . , 248(N) that select which row or rows receive current from the diode driver 104. In this implementation, a high-side switch 242 controls a connection with a power supply. As shown in FIG. 2, the power supply provides a 5V DC. In this implementation, a low-side switch 244 is connected to ground and a lead of the inductor 206 connected to the second inductor terminal 214. As shown in FIG. 2, a current threshold detector 232 is between the switch 244 and ground is. In this implementation, a short switch 246 is connected to ground and a lead of the inductor 206 connected to the first inductor terminal 212. In some implementations, the lidar controller 110 controls the switches in the diode driver 104. In some implementations, the diode driver 104 includes a switch controller (not pictured) that controls the switches.

FIG. 2 also shows a path 270 for current to flow from the first inductor terminal 212. This path is used to transmit current to a device state analyzer 270. The device state analyzer 270 is configured to determine whether a portion of the array of diodes, e.g., 202(1,1), . . . , 202(1,M1), is defective. Further details regarding the device state analyzer are discussed with respect to FIG. 3.

During operation, the diode driver circuit 104 is initially powered up and is preparing to drive current to the array of diodes 102. In some implementations, the lidar controller 110 transmits data, e.g., a current setting which sets or dictates a predetermined current threshold during charging, for example a current setting of between and including 2.25 Amps to 10 Amps. In some implementations, the data from lidar controller 110 indicates a pulse width, which sets or dictates a predetermine period of time such as between and including 3 nanoseconds (ns) and 20 ns. The lidar controller 110 may communicate a row selection. In response to the data being transmitted to the diode driver 104 (e.g., received by a controller), the diode driver 104 closes the designated row switch(es) 248($i$), 1≤$i$≤N such that the current is delivered to the portion(s) of the array of diodes 102 corresponding to the designated row switches(es) 248($i$).

In this implementation, after receiving the data from the lidar controller 110, the diode driver 104 then places the plurality of switches in a charge configuration. For charge configuration, the diode driver 104 closes the high-side switch 242, closes the short switch 246, and opens the low-side switch 244. Accordingly, the voltage supply VS is coupled to the inductor 206 through the high-side switch 242, and the inductor 206 is coupled to ground through the shorting switch 246. Current is generated through the inductor 206 as the electromagnetic field generated in the vicinity of the windings of the inductor 206 increases in amplitude. The charging of the inductor 206 continues until the inductor current reaches a predetermined threshold.

In response to the current reaches the predetermined threshold, the diode driver 104 transitions to placing the plurality of electrically controlled switches in a discharge configuration that drives the inductor current through the selected portion of the array of diodes 102. Driving the inductor current includes opening the high-side switch 242, closing the low-side switch 244, and opening the shorting switch 246. The driving may also comprise closing the selected row switch if that switch is not closed. Moreover, the diode driver 104 may send an indication to the lidar controller 110 that the driving of the inductor current has begun. Because current through an inductor 206 cannot change instantaneously, the inductor 206 thus drives the inductor current to the selected portion or row of the array of diodes 102. The diode driver 104 accordingly drives the inductor current to the selected row for the predetermined period of time. In some implementations, the driving may end based on other considerations such as the inductor current falling below a threshold.

In response to ending the driving of the inductor current, the diode driver 104 transitions to placing the switches in a recirculation configuration, in which the remaining inductor current is recirculated in the inductor 206. In particular, the diode driver 104 closes the short switch 246. Given that the low-side switch 244 is already closed or conductive from the driving step, closing the short switch 246 effectively shorts the leads of the inductor 206 (through the ground). Accordingly, the remaining inductor current circulates through the inductor 206.

In some implementations, a monitoring pulse generator generates a monitoring current pulse and delivers the monitoring current pulse to the portion of the array of diodes 102 that was activated by the operating current. The monitoring pulse generator includes a current threshold detector 232. As shown in FIG. 2, the current threshold detector 232 takes the form of a comparator, for instance implemented as an operational amplifier 230, wherein a comparison occurs with a reference current. The current threshold detector 232 may be arranged at any location in the circuit in recirculation mode, e.g., with the low-side switch 244 and shorting switch located between the low-side switch 244 and ground 246 closed and the high-side switch 242 opened. In some implementations and as shown in FIG. 2, the current threshold detector 232 is arranged at the side of the low-side switch 244 rather than at the side of the shorting switch 246. Such a configuration may be beneficial in terms of time lapse. Moreover, the current of the shorting switch is more representative of the load pulse current as sensed on the coil side of the load (row switches 248(1), . . . , 248(N)). Hence, in this manner, the shorting switch 246 may be allocated for nominal current detection and the low-side switch 244 may be allocated for the monitoring current detection. Additionally, in this way, the high-side switch 242 may be allocated for safety over-current detection.

The reference current may be defined as a minimum inductor current needed for discharging a monitoring current pulse. The short switch 246 may be opened and a monitoring pulse of inductor current may flow into the same row of diodes to which the preceding current pulse has gone. In some implementations, the reference current is selected in order to produce a discharge and to stay below a safety level and/or a level which does not affect the time of flight measurement of the previous pulse. In some implementations, the monitoring current pulse will be delivered to a different row of diodes; such a redirection of the monitoring current pulse may be effected by closing and opening relevant switches 248(1), 248(2), . . . , 248(N). The operating current pulse may have an impact on the temperature of the diodes and hence on the resistive load of the relevant portion of the array of diodes 102. Nevertheless, opening and closing switches 248(1), 248(2), . . . , 248(N) takes a finite amount of time (e.g., 1-3 msec) and hence may introduce latency that does not occur in the case in which a monitoring current pulse is delivered to the same row of diodes as the preceding operating current pulse.

As a consequence of the monitoring current pulse, a peak voltage will occur at the selected output path, e.g., 260(1). This peak voltage depends on the state of the diodes in the relevant portion, e.g., 260(1) of the array of diodes 102. The diodes 202(1,1) and 202(1,M1) are switched to ground. In response to one or more diodes 202(1,1) and 202(1,M1) failing, the impedance changes. For example, the impedance will strongly decrease in case of a short to ground, and it may decrease or increase in case of malperformance of individual diodes. Hence the peak voltage (i.e., the product of the row impedance and the current of the monitoring current pulse) may vary over time.

The device state analyzer 270 is configured to measure the peak voltage and compare it with a reference. Details of this analyzer 270 are shown in FIG. 3.

Figure 3:
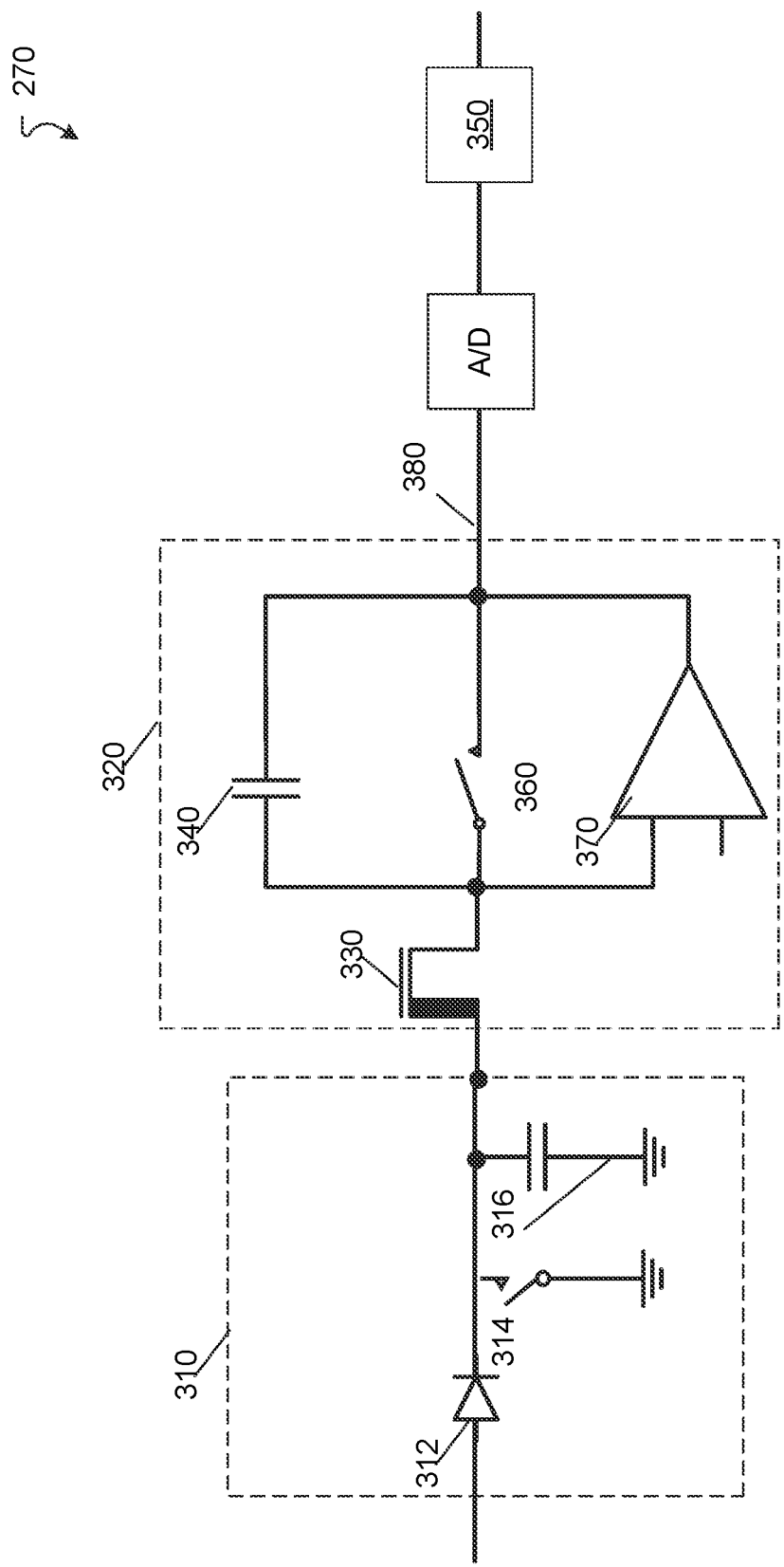
FIG. 3 is a schematic diagram that illustrates an example device state analyzer for determining whether a portion of the diode array is defective.

FIG. 3 is a schematic diagram that illustrates an example device state analyzer 270 for determining whether a portion of the array of diodes 102 is defective. As shown in FIG. 3, the device state analyzer 270 includes a collector 310 and a converter 320. In some implementations, the device state analyzer also includes a memory for storage of reference data that are for use in the converter 320. The converter 320 is configured as a voltage drop measurement device to provide a voltage variation over time as an output, i.e. a variation of the peak voltage relative to a reference voltage. In some implementations, the collector 310 is separate from the converter 320 so as to minimize the occurrence of any leakage current during operation. Moreover, this separation enables that the processing steps applied on the captured peak voltage collected in the collector 310 may occur at a time later than the occurrence of the monitoring current pulse. Since the monitoring current pulse may be short, e.g., having a duration of 10 nanoseconds or less, it may be advantageous that the processing occur afterwards and at a lower rate. This output goes to an A/D-converter via an egress 380 prior to transmission to a failure identifier 350.

The failure identifier 350 determines whether a portion of the array of diodes 102 based on the output voltage variation is defective. In some implementations, the failure identifier 350 includes a digital signal processor and/or software running on a digital signal processor within the diode driver 104. In some implementations, the failure identifier 350 may be present as a separate unit within the diode driver 104 and/or be arranged in the lidar controller 110.

The failure identifier 350 compares a sensed voltage variation with reference data, such as historical data and or data of other rows of diodes, and to identify whether the voltage variation indicates defects of one or more diodes in the portion of diodes. Reasons for a voltage variation may include temperature variations, variations in the preceding current pulse and variations due to aging, and variations due to a failure. Even when a failure in one diode occurs, it is not necessarily such that the entire row of diodes does no longer perform adequately. Accordingly, the failure identifier 350 assesses whether the sensed voltage variation indicates a failure and whether a failure message is to be created.

As shown in FIG. 3, the collector 310 includes a rectifying diode 312, a switch 314, a capacitor 316 coupled to ground. The capacitor is configured to store charge corresponding to the peak voltage occurring in an output path, e.g., at terminal 248(1). In order to avoid disturbance due to earlier monitoring pulses and/or leakage current entering into the capacitor 316 In response to discharging inductor current into a current pulse, a switch 314 is present. Accordingly, any leakage current may be removed from the capacitor 316. The rectifying diode 312 is additionally present for sake of robustness.

The converter 320 comprises a transfer device 330 and a series of devices 340, 360, and 370 resulting in the generation of the voltage variation at the output of the converter 320. In some implementations, the transfer device 330 is a transistor. The series of device includes a second capacitor 340, a hold switch 360 and a comparator 370, for instance implemented as an operational amplifier. The devices 340, 360, and 370 are connected in parallel.

Figure 4:
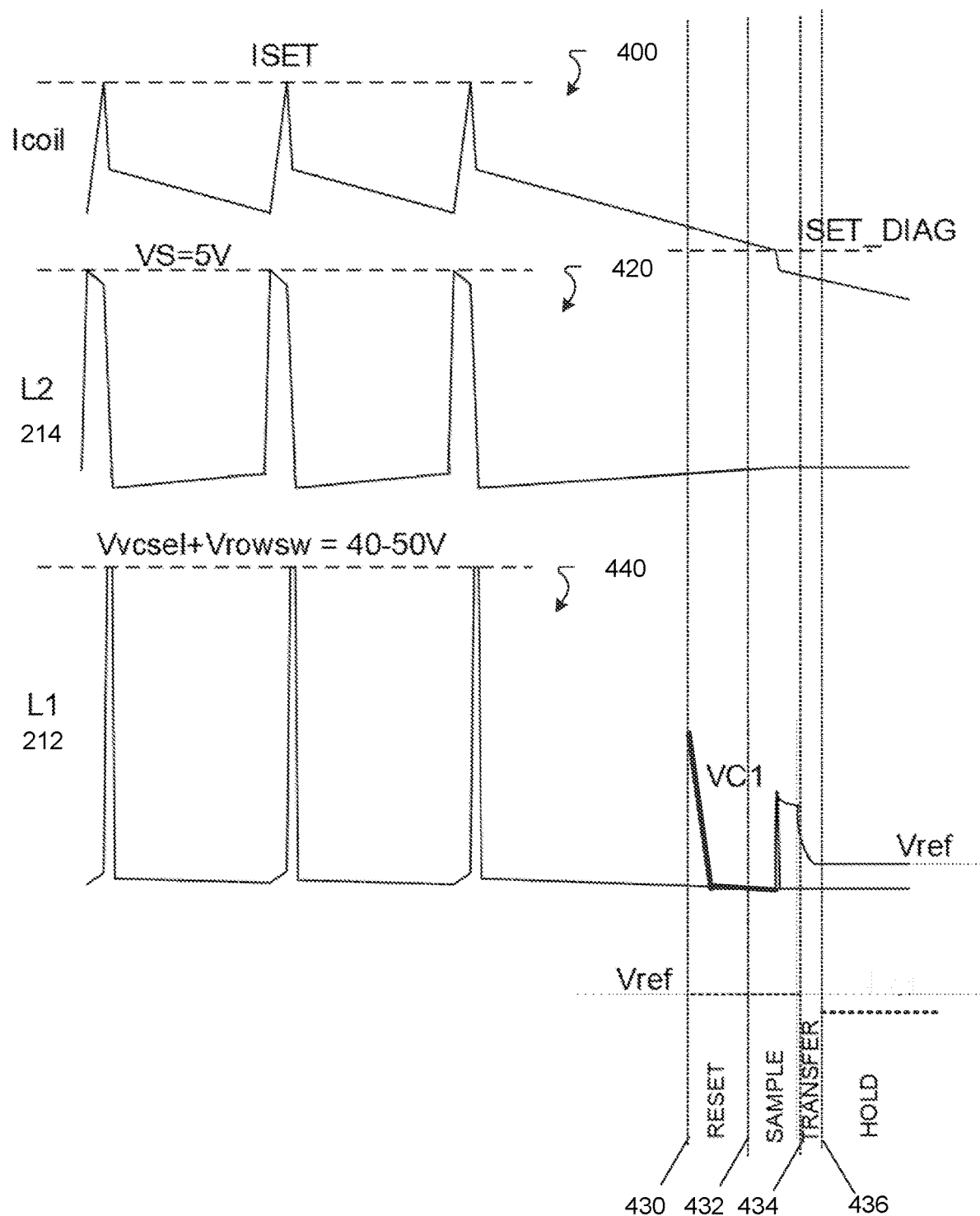
FIG. 4 is a diagram that illustrates temporal behavior of current and voltage in an inductor coil and at terminals of the conductor as the operating and diagnostic current pulses are produced and delivered to the diode array.

The operation of the collector 310 and converter 320 are described in further detail with respect to FIG. 4.

FIG. 4 is a diagram that illustrates via plots 400, 420, 440 temporal behavior of current and voltage in the coil of the inductor 206 (plot 400) and at terminals 212, 214 of the inductor 206 as the operating and diagnostic current pulses are produced and delivered to the array of diodes 102 (plots 420 and 440). Also shown in FIG. 4 is temporal behavior of voltage on the first capacitor 316.

With regard to plot 420 showing voltage at the second inductor terminal 214, the supply voltage VS=5V is coupled to the terminal 214. The charging of the inductor 206 is effected by closing switched 242 and 246 and opening switch 244. The plot 400 shows three operating current pulses so generated.

With regard to the plot 400, the current in the coil increases due to the charging. In response to the target current ISET being achieved, the switches are reversed to begin discharge, i.e., delivery of the current pulse to the array of diodes 102. The sharp decrease of the inductor current causes the voltage at the terminal 214 decreases. This is reflected in the plot 420, when the voltage at the terminal 214 decreases. In some implementations, the decrease is slow for a short time followed by a steeper decrease afterward. In some implementations, the delivery of the operating current pulse increases the voltage across the portion of the array of diodes 102.

The increase in the voltage across the portion of the array of diodes 102 is shown in plot 440. In plot 440, a sharp increase in the voltage at the first inductor terminal 212 occurs, taking the form of a narrow pulse with a voltage peak. Plot 400 also illustrates that the current in the inductor 206 does not vanish after the operating current pulse is delivered. Nevertheless, after the last operating current pulse, the current decreases relatively slowly. Meanwhile, the voltage on the inductor terminal 214 (plot 420) increases slowly.

As the current in the inductor 206 decreases and the voltage at the terminal 214 increases, the monitoring current pulse is initiated. At time 430, the charge in the capacitor 316 is reset. Resetting the charge in the capacitor 316 causes the charge in the capacitor 316 to decrease to a background voltage, e.g., zero. The time 430 occurs after the delivery of the operating current pulse to the portion of the array of diodes 102.

At time 432, the charge on the capacitor 316 is sampled. After this time, when the current in the inductor 206 drops below a threshold ISET_DIAG, the monitoring current pulse is initiated. The crossing of this threshold causes the driver to be switched back from recirculating the inductor current to delivering the monitoring current pulse. Accordingly, the inductor current decreases stepwise, as is visible in plot 400. The voltage on the inductor terminal 214 does not increase any further, as shown in plot 420. The voltage on the inductor terminal 212 again increases to generate a peak voltage. This peak voltage is sampled in the collector 310, in other words stored in the capacitor 316, leading to an increase of the voltage level in the collector 310.

After the peak voltage has been sampled in the capacitor 316 at time 434, the voltage in the collector 310 is transferred to the second capacitor 340 of the converter 320 using the transfer device 330. Accordingly, the voltage level at the capacitor 316 decreases. The transfer of the charge results in an activation of the operational amplifier 370, which compares the voltage at the capacitor 340 to a reference voltage. As a consequence, the output voltage of the converter 320 changes from the reference voltage to a diagnosed voltage thus identifying the voltage variation. At time 436, the diagnosed voltage is placed on hold via switch 360, during further signal processing such as an AD-conversion.

Figure 5:
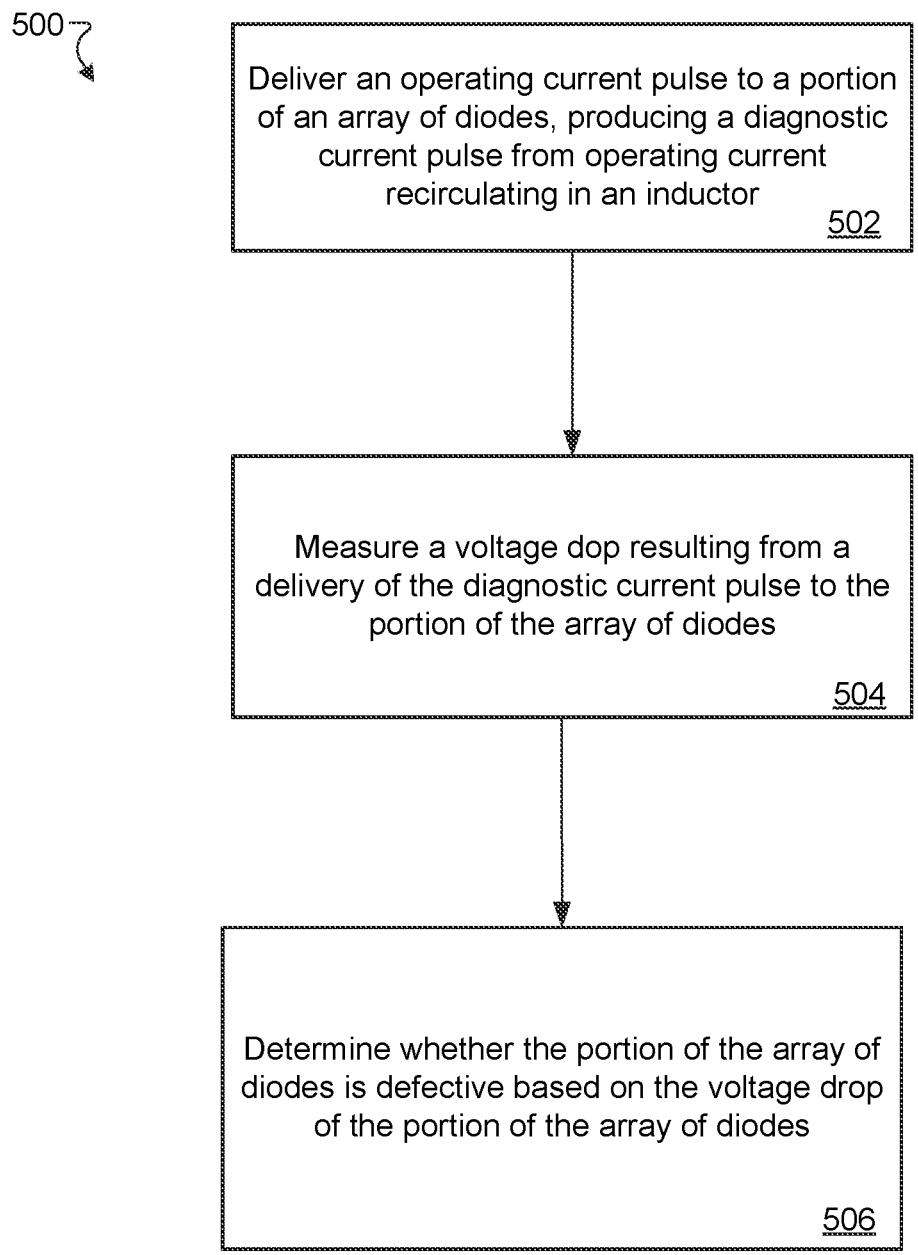
FIG. 5 is a flow chart that illustrates an example method for diagnosing a diode array according to improved techniques.

FIG. 5 is a flow chart that illustrates an example method 500 for detecting defective diodes in a diode array according to improved techniques.

At 502, a current pulse generator (e.g., in diode driver 104) delivers an operating current pulse to a portion of an array of diodes (e.g., array of diodes 102), the current pulse generator producing a diagnostic current pulse in an inductor (e.g., inductor 206) from residual current from the operating current pulse recirculating in the inductor after the operating current pulse has been delivered to the portion of the array of diodes.

At 504, a voltage drop measurement device (e.g., converter 320) measures a voltage drop resulting from a delivery of the diagnostic current pulse to the portion of the array of diodes.

At 506, a device state analyzer (e.g., device state analyzer 270) determines whether the portion of the array of diodes is defective based on the voltage drop of the portion of the array of diodes.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

The various apparatus and techniques described herein may be implemented using various semiconductor processing and/or packaging techniques. Some embodiments may be implemented using various types of semiconductor processing techniques associated with semiconductor substrates including, but not limited to, for example, Silicon (Si), Gallium Arsenide (GaAs), Silicon Carbide (SiC), and/or so forth.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present.

Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A diode driver for driving an array of diodes, comprising:
    a current pulse generator configured to deliver an operating current pulse to a portion of the array of diodes, the current pulse generator producing a diagnostic current pulse in an inductor based on a residual current from the operating current pulse recirculating in the inductor, the diagnostic current pulse being less than the operating current pulse;
    a voltage drop measurement device configured to measure a voltage drop resulting from a delivery of the diagnostic current pulse to the portion of the array of diodes; and
    a device state analyzer configured to determine whether the portion of the array of diodes is defective based on the voltage drop of the portion of the array of diodes.

2. The diode driver as in claim 1, wherein the diagnostic current pulse is a first diagnostic current pulse and the voltage drop is a first voltage drop,
    wherein the current pulse generator, after producing the first diagnostic current pulse, produces a second diagnostic current pulse for measuring a second voltage drop, and
    wherein the device state analyzer determines whether the portion of the array of diodes is defective based on the first voltage drop and the second voltage drop.

3. The diode driver as in claim 2, wherein the device state analyzer includes:
    a first capacitor storing charge from diagnostic current pulses, and
    a conversion device to convert first charge stored on the first capacitor from the first diagnostic current pulse and second charge stored on the first capacitor from the second diagnostic current pulse to a voltage signal that indicates a variation of voltage drop of the portion of the array of diodes over time.

4. The diode driver as in claim 3, wherein the conversion device includes:
    a second capacitor, a hold switch, and a comparator connected in parallel, the hold switch holding charge on the second capacitor for measurement, and
    a transfer device transferring the charge on the first capacitor to the second capacitor after the diagnostic current pulse has been delivered.

5. The diode driver as in claim 3, wherein the first capacitor is reset prior to the current pulse generator delivering the first diagnostic current pulse.

6. The diode driver as in claim 1, wherein each portion of the array of diodes is a respective row of the array of diodes, and wherein the device state analyzer is connected to each row of the array of diodes via a parallel connection.

7. The diode driver as in claim 1, wherein the diagnostic current pulse has a width between 2 nanoseconds and 10 nanoseconds.

8. The diode driver as in claim 1, wherein the current pulse generator includes:
   a low-side switch (SWL) which, in response to being closed, is configured to couple a second induction terminal to a ground terminal, and
   a shorting switch (SHRT) which, in response to being closed, is configured to couple a first induction terminal to the ground terminal, and
   wherein the current pulse generator recirculates current in the inductor when the SWL and the SHRT are both closed.

9. The diode driver as in claim 1, wherein the current pulse generator includes a current threshold detector that detects when the residual current in the inductor has reached a threshold in response to which the current pulse generator is configured to deliver the diagnostic current pulse.

10. The diode driver as in claim 9, wherein the current pulse generator includes a low-side switch (SWL) which, when closed, couples a second induction terminal to a ground terminal, and a shorting switch (SHRT) which, when closed, is configured to couple a first induction terminal to the ground terminal, and
   wherein the current threshold detector is arranged between the SWL and the ground terminal.

11. The diode driver as in claim 1, wherein the voltage drop measurement device includes an analog/digital (A/D) converter, and
   wherein the device state analyzer configured to determine whether the portion of the array of diodes is defective based on the voltage drop of the portion of the array of diodes is further configured to determine based on a digital algorithm.

12. A method, comprising:
   delivering, via a current pulse generator, an operating current pulse to a portion of an array of diodes in response to a current in an inductor being greater than or equal to a target current, the current pulse generator producing a diagnostic current pulse in the inductor based on a residual current from the operating current pulse recirculating in the inductor, the diagnostic current pulse being less than the target current;
   measuring a voltage drop resulting from a delivery of the diagnostic current pulse to the portion of the array of diodes; and
   determining whether the portion of the array of diodes is defective based on the voltage drop of the portion of the array of diodes.

13. The method as in claim 12, wherein the operating current pulse is delivered to the portion of the array of diodes via the inductor.

14. The method as in claim 12, wherein the operating current pulse is delivered to the portion of the array of diodes without measuring a voltage drop.

15. The method as in claim 12, wherein the diagnostic current pulse is a first diagnostic current pulse and the voltage drop is a first voltage drop,
   wherein the method further comprises:
      after producing the first diagnostic current pulse, producing a second diagnostic current pulse for measuring a second voltage drop, and wherein determining whether the portion of the array of diodes is defective includes:
      determining whether the portion of the array of diodes is defective based on the first voltage drop and the second voltage drop.

16. The method as in claim 15, wherein determining whether the portion of the array of diodes is defective includes:
   storing charge from diagnostic current pulses on a first capacitor; and
   converting first charge stored on the first capacitor from the first diagnostic current pulse and second charge stored on the first capacitor from the second diagnostic current pulse to a voltage signal that indicates a variation of voltage drop of the portion of the array of diodes over time.

17. The method as in claim 16, wherein converting includes
   transferring the first charge on the first capacitor to produce a second charge on a second capacitor after the diagnostic current pulse has been delivered; and
   holding the second charge on the second capacitor for measurement.

18. The method as in claim 16, further comprising:
   resetting the first capacitor prior to the current pulse generator generating the diagnostic current pulse.

19. A lidar system, comprising:
   an array of diodes configured to produce illumination in response to receiving an amount of current, and
   a diode driver for driving an array of diodes, comprising:
      a current pulse generator configured to deliver an operating current pulse to a portion of the array of diodes, the current pulse generator producing a diagnostic current pulse in an inductor based on a residual current from the operating current pulse recirculating in the inductor, the diagnostic current pulse being less than the operating current pulse;
      a voltage drop measurement device configured to measure a voltage drop resulting from a delivery of the diagnostic current pulse to the portion of the array of diodes; and
      a device state analyzer configured to determine whether the portion of the array of diodes is defective based on the voltage drop of the portion of the array of diodes.

20. The lidar system of claim 19, wherein
   the current pulse generator includes a current threshold detector that detects when the current in the inductor has reached a threshold after which the current pulse generator is configured to deliver the diagnostic current pulse.

* * * * *